Patented Oct. 13, 1925.

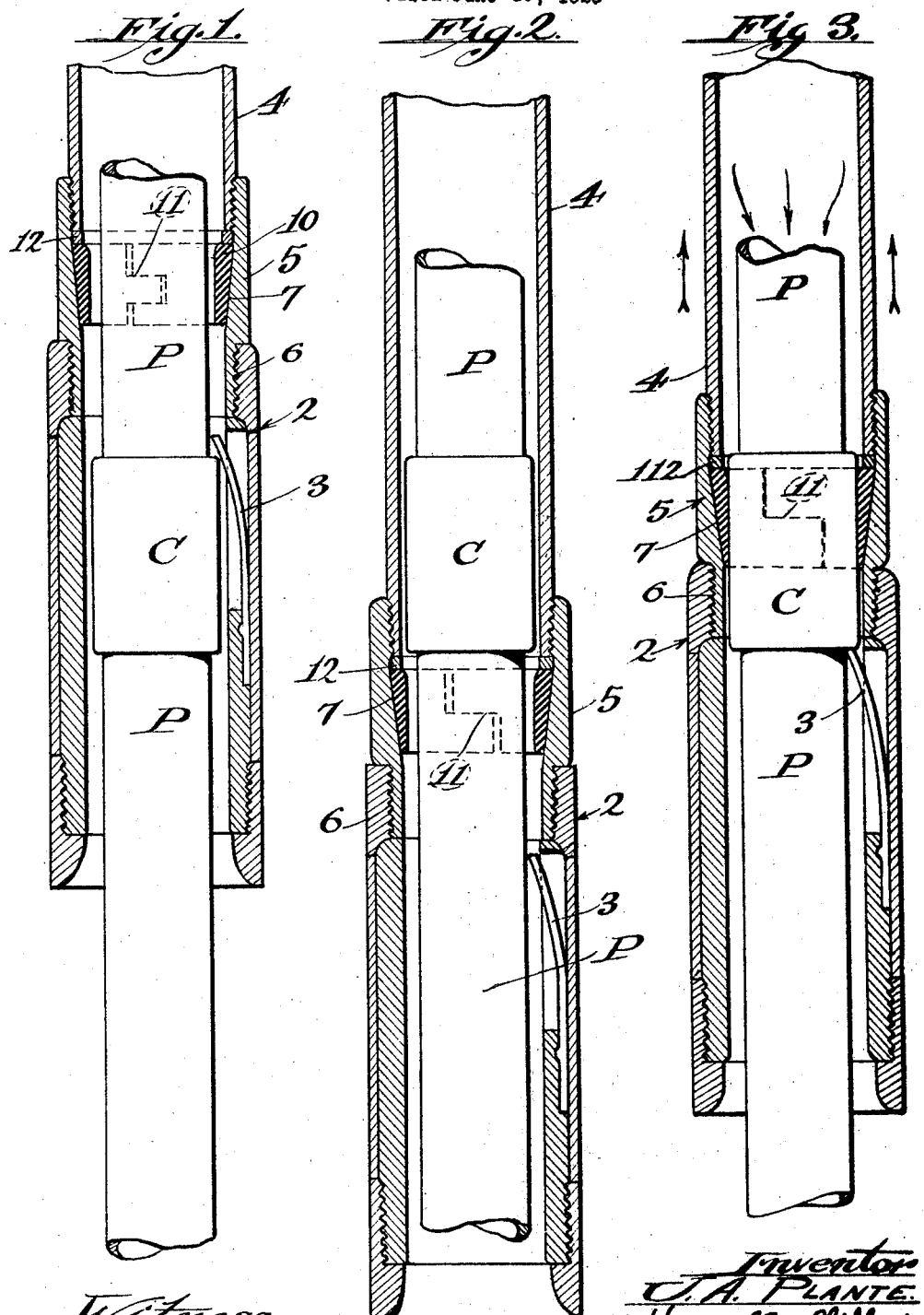

1,557,480

UNITED STATES PATENT OFFICE.

JOSEPH A. PLANTE, OF SAN PEDRO, CALIFORNIA.

COUPLING AND PIPE PACKER.

Application filed June 15, 1923. Serial No. 645,578.

*To all whom it may concern:*

Be it known that I, JOSEPH A. PLANTE, a citizen of the United States, residing at San Pedro, in the county of Los Angeles and State of California, have invented new and useful Improvements in Coupling and Pipe Packers, of which the following is a specification.

This invention relates to deep well fishing tools, and has for an object to provide an improved packing means whereby circulating fluid can be prevented from passing down around the outside of a drill pipe in a well hole and will be compelled to flow down in through the drill pipe in the well hole, and which is gripped or engaged by the fishing tool parts.

My present invention is shown as incorporated with an overshot fishing tool which is adapted to run down over and encompass, for instance, a string of drill pipe, and my invention consists in means for making a packed joint between the fishing string and the drill pipe.

Other objects and advantages will be made manifest in the following specification of an embodiment of the invention illustrated in the accompanying drawings, wherein—

Figure 1 is a longitudinal section of the packer with the parts in preliminary position, before being set.

Fig. 2 is a longitudinal section showing the parts in the lowered position below the drill pipe coupling.

Fig. 3 is a sectional view showing the packer set on the coupling.

For purposes of illustration, the present invention is shown as combined with an overshot fishing tool having a barrel or shoe 2, with a suitable number of spring latches 3, arranged within the barrel and normally contracting so that the shoe is run down in a well and passes over and encompasses a drill pipe P, which may be built up of sections connected by standard couplings C.

Frequently, it is desirable to force a circulating medium down through the drill pipe P, and this circulation may be established through the tubular fishing string 4, to which the barrel 2 is, in the present case, secured by an intermediate joint or coupling 5. The joint 5 has its lower end threaded at 6 into the barrel 2, and is provided with an internal, conical seat 7, upon which is laid a packing ring 10, which preferably is split and has overlapping end portions 11 forming, therefore, an expansible ring which is adapted to slip down over the drill pipe couplings C until the packing passes below the coupling C which is to be grappled by the fishing tool.

After the spring hooks have been lowered to a position below the desired coupling C, the fishing tool is then pulled upwardly until the springs 3 run up against the lower shoulder of the coupling C. The relation of the springs 3 to the packing 10 is such that when the springs 3 engage the coupling, the packing ring 10 will be disposed around the engaged coupling.

There may be interposed between the upper end of the packing ring 10 and the fishing pipe 4 a retaining ring 12.

From the above it will be seen that the improved packer is adapted to be lowered down into the well and adjusted circumferentially about a coupling, or other suitable part, or the drill pipe or other pipe in the well, and then when pressure is introduced into the fishing string 4, it becomes effective upon the packing ring 10 to compress the same between its conical seat 7 and the encircled coupling C, with the result that a substantially leak-proof joint is formed about the coupling and between the fishing tool parts so that the pressure fluid in the fishing string is compelled to pass down inside of the drill pipe P and thence upwardly outside of the string 4.

I have therefore provided a novel method for providing for circulation through a drill or through pipe in a well by forming a packed joint between the drill pipe and a fishing tool string of pipe sections in which fluid is subjected to pressure and must flow down through the drill pipe or other encircled pipe and thence upwardly outside of the fishing string.

Further embodiments, modifications and variations may be resorted to within the principle of the invention.

What is claimed is:

1. A coupling and pipe packer including a member having an interior packing seat, an expansible split ring packer mounted upon the packing seat, and spring latches below the packing seat, the packing ring being adapted to encircle a part of a fish in a well and to expand to allow couplings to pass and the latches serving to locate a coupling in the seat so as to form a tight joint between the coupling and the packing.

2. A coupling and pipe packer including a member having an interior packing seat, a split ring packing mounted upon the packing seat, and latches below the packing so that the coupling and pipe packer may be passed downwardly over a string of pipe and couplings and so that when the apparatus has been lowered to the desired extent the latches will engage under a coupling and hold the coupling in the packing to form a tight joint.

In testimony whereof I have signed my name to this specification.

JOSEPH A. PLANTE.